US011409498B2

(12) United States Patent
Utsumi et al.

(10) Patent No.: US 11,409,498 B2
(45) Date of Patent: Aug. 9, 2022

(54) DATA PROCESSING SYSTEM AND DATA PROCESSING METHOD

(71) Applicant: HITACHI, LTD., Tokyo (JP)

(72) Inventors: Masato Utsumi, Tokyo (JP); Tohru Watanabe, Tokyo (JP); Yoshihisa Okamoto, Tokyo (JP); Ikuo Shigemori, Tokyo (JP); Hiroshi Iimura, Tokyo (JP); Hiroaki Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 796 days.

(21) Appl. No.: 16/332,076

(22) PCT Filed: Nov. 17, 2017

(86) PCT No.: PCT/JP2017/041400
§ 371 (c)(1),
(2) Date: Mar. 11, 2019

(87) PCT Pub. No.: WO2018/105357
PCT Pub. Date: Jun. 14, 2018

(65) Prior Publication Data
US 2019/0369963 A1 Dec. 5, 2019

(30) Foreign Application Priority Data
Dec. 5, 2016 (JP) .............................. JP2016-236105

(51) Int. Cl.
G06F 7/575 (2006.01)
G06F 17/18 (2006.01)
(52) U.S. Cl.
CPC .............. *G06F 7/575* (2013.01); *G06F 17/18* (2013.01)
(58) Field of Classification Search
CPC .................................. G06F 7/575; G06F 17/18
See application file for complete search history.

(56) References Cited

U.S. PATENT DOCUMENTS

2013/0184885 A1  7/2013  Keil et al.
2016/0033949 A1  2/2016  Noda et al.
2018/0128863 A1  5/2018  Utsumi et al.

FOREIGN PATENT DOCUMENTS

JP  2006-331229 A  12/2006
JP  2007-199862 A   8/2007
(Continued)

OTHER PUBLICATIONS

International Search Report, PCT/JP2017/041400, dated Feb. 13, 2018, 2 pgs.
(Continued)

Primary Examiner — Bijan Mapar
(74) Attorney, Agent, or Firm — Volpe Koenig

(57) ABSTRACT

A data processing system calculates prediction or planning data of an object from observation data of a calculation object of the prediction or planning data and observation data of various factors, including a first processing section which identifies a model used for calculation of the prediction or planning data of each of the factors, a second processing section which calculates data which indices the kind of a time transition of the factor from the observation data of the factor and classifies the observation data of the factor by using the calculated data which indicates the kind of the time transition, and a third processing section which changes the model for calculation of the prediction or planning data on the basis of the classified observation data and the prediction data of the factor in a prediction or planning data calculation object time period and calculates the prediction or planning data.

16 Claims, 11 Drawing Sheets

(56) References Cited

FOREIGN PATENT DOCUMENTS

| | | |
|---|---|---|
| JP | 2009-225613 A | 10/2009 |
| JP | 2013-222423 A | 10/2013 |
| JP | 2014-180187 A | 9/2014 |
| JP | 2016-081452 A | 5/2016 |
| JP | 2016-220515 A | 12/2016 |

OTHER PUBLICATIONS

Communication pursuant to Article 94(3) EPC dated Nov. 13, 2020 for European Patent Application No. 17879598.5.

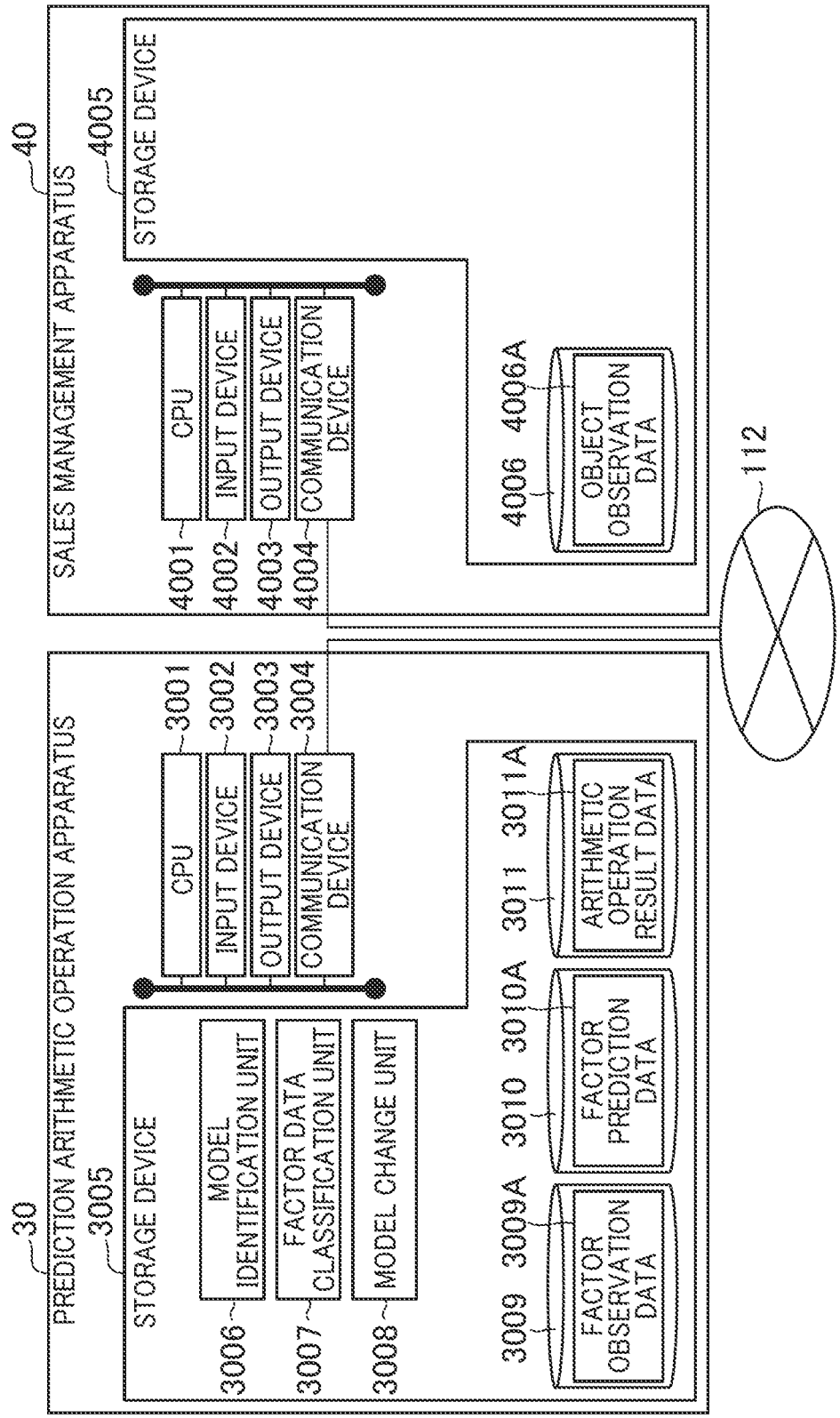

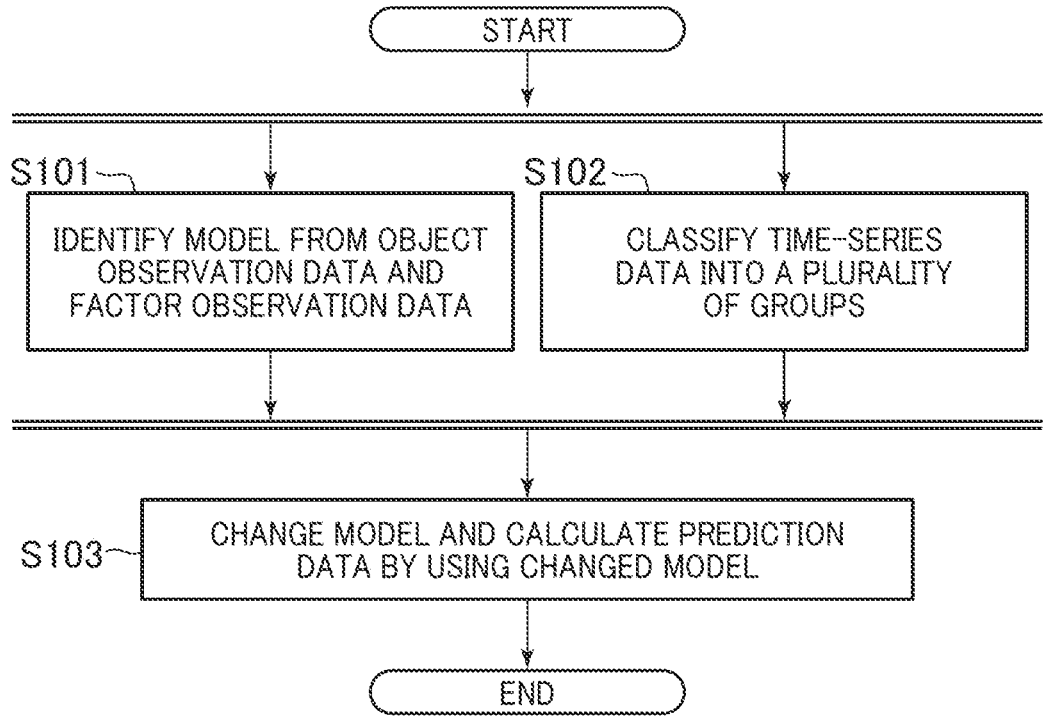
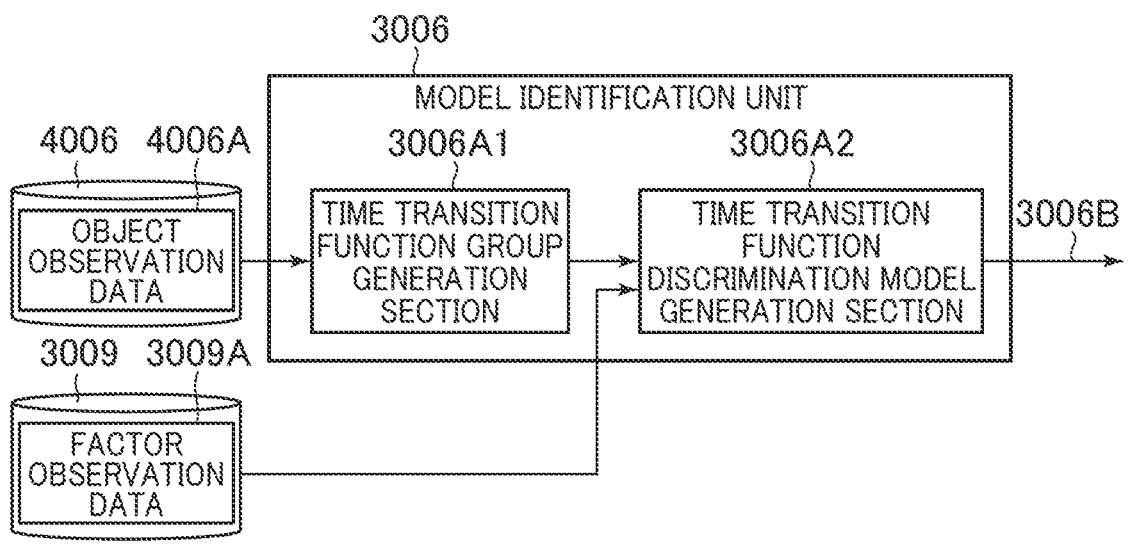

DATA PROCESSING SYSTEM AND DATA PROCESSING METHOD

TECHNICAL FIELD

The present invention relates to a data processing system and a data processing method.

BACKGROUND ART

Recently, the importance of performing prediction of a future predetermined time period which is based on past observation data or plan generation which relates to facility control or a business process has been increased. For example, in the electric power industry field, an electricity utility which sales the electricity to consumers on the basis of concluded electricity supply contracts, generates the electricity to be sold by its own electric generator or procures the electricity directly from other electricity utilities or via an exchange is requested to make a procurement amount of the electricity match a sales amount of the electricity at every settlement time. Accordingly, it becomes important for the electricity utility to exactly predict a future value of the total (the total contract demand) of demands (contract demands) of the consumers with whom the own company makes contracts.

As a technology for performing the above-mentioned prediction, for example, in Paten Literature 1, there is disclosed a technology of predicting the power demand in a prediction object time by using first mean temperature data in a first accumulated time which goes back from the prediction object time and second mean temperature data in a second accumulated time which is longer than the first accumulated time which goes back from the prediction object time.

CITATION LIST

Patent Literature

Patent Literature 1: Japanese Patent Application Laid-Open No. 2009-225613

SUMMARY OF INVENTION

Technical Problem

In general, for example, even when representative values of a factor (an explanatory variable) such as the highest temperature and the lowest temperature, or a daily mean temperature and so forth are the same as each other, in a case where time transitions of those values of the factor (the explanatory variable) are different from each other, also values of a prediction object such as a maximum value, a minimum value and so forth of the power demand which are observed are different from each other. In the prior art, although the first mean temperature data and the second mean temperature data are used, it is not equipped with first and second mean temperature data calculation means which exactly indicate the time transitions of values of the factor such as the above. Therefore, in the prior art, prediction which reflects the time transitions of the factor such as the above cannot be realized and accordingly there was such a problem that improvement of prediction accuracy is difficult.

The present invention has been made by taking the above point into consideration and aims to realize prediction or planning calculation which takes a difference in time transition between values of the factor which pertains to the prediction or planning calculation into consideration.

Solution to Problem

In order to solve this problem, in the present invention, a data processing system which calculates prediction data or planning data of an optional object has an arithmetic operation unit which changes a model which is used in an arithmetic operation for calculation of the prediction data or the planning data on the basis of pieces of information which indicate time transitions of values of various factors which pertain to the prediction data or the planning data. On this occasion, change includes a case of changing a parameter value of one model, a case of changing one model to another model which is quite different in the form of a formula. In addition, as the data processing system, it can be configured by a data processing system which calculates prediction data or planning data of an object from observation data of a calculation object of the prediction data or the planning data and pieces of observation data of the various factors which pertain to a projection object or a planning object and which is the one having a first processing section which identifies the model which is used in calculation of the prediction data or the planning data from a calculation object and respective pieces of observation data of that factor, a second processing section which calculates data which indicates the kind of the time transition of the factor from the observation data of the factor and classifies the observation data of the factor by using the calculated data which indicates the kind of the time transition, and a third processing section which changes the model which calculates the prediction data or the planning data on the basis of the classified observation data of the factor and prediction data of the factor in a prediction or planning data calculation object time period and calculates the prediction data or the planning data.

In addition, in order to this problem, in the present invention, it is possible to configure a data processing method of calculating prediction data or planning data of an object from observation data of a calculation object of the prediction data or the planning data and pieces of observation data of various factors which pertain to a prediction object or a planning object, the data processing method having a first step of identifying the model used for calculation of the prediction data or the planning data from the calculation object and respective pieces of observation data of that factor, a second step of calculating data which indicates the kind of a time transition of the factor from pieces of the observation data of the factor and classifying pieces of the observation data of the factor by using the calculated data which indicates the kind of the time transition, and a third step of changing the model which calculates the prediction data or the planning data on the basis of the classified observation data of the factor and the prediction data of the factor in a prediction or planning data calculation object time period and calculating the prediction data or the planning data.

Advantageous Effect of Invention

According to the present invention, it becomes possible to realize prediction or planning calculation that a difference between the time transitions of values of the factor which pertains to the prediction or planning calculation.

BRIEF DESCRIPTION OF DRAWINGS

FIG. 3 is a function configuration diagram of respective apparatuses which configure the data processing system.

FIG. 4 is a flowchart illustrating procedures of prediction arithmetic processing.

FIG. 5 is a function block diagram illustrating one embodiment of model identification processing.

DESCRIPTION OF EMBODIMENTS

In the following, one embodiment of the present invention will be described in detail with reference to the drawings.

(1) First Embodiment (1-1) Whole Configuration

Figure 1:
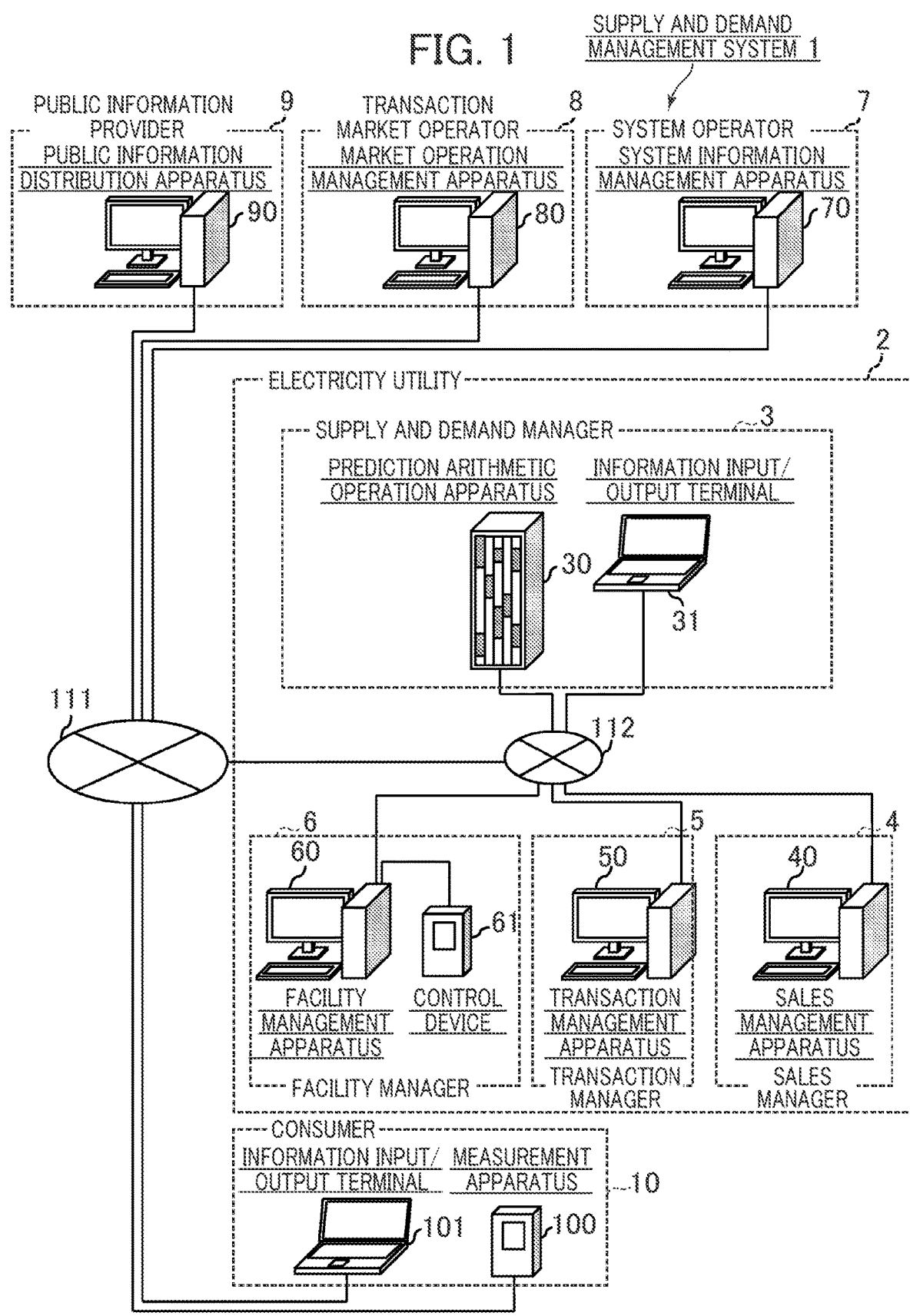
FIG. 1 is a whole configuration diagram of a supply and demand management system.

A whole configuration of a supply and demand management system 1 in a case where the present invention is embodied in prediction of power demand is illustrated in FIG. 1. The present supply and demand management system 1 is a system adapted to calculate prediction data of the demand in an optional time period on the basis of demand achievement information and to execute calculation and control of a power generator operation plan which is operable on the basis of the calculated prediction data of the demand or to perform calculation and execution of a transaction plan for electric power procurement from another/other electricity utility/utilities or from an exchange and is configured by various apparatuses and various terminals that an electricity utility 2, a system operator 7, a transaction market operator 8, a public information provider 9 and a consumer 10 have respectively. In addition, communication paths 111 and 112 are communication paths which mutually connect the various apparatuses and terminals which configure the supply and demand management system 1 to be mutually communicable and are configured by, for example, LAN (Local Area Network)s.

The electricity utility 2 is a utility which is configured by a supply and demand manager 3, a sales manager 4, a transaction manager 5 and a facility manager 6.

The supply and demand manager 3 is a department or a person in charge which/who predicts a demand amount in a future predetermined time period in units of settlement times, for example, in units of 30 minutes and manages a procurement amount of the electric power so as to be able to meet the predicted demand amount and is equipped with a prediction arithmetic operation apparatus 30 adapted to calculate prediction data of the demand and an information input/output terminal 31 adapted to perform data exchange with the apparatus.

The sales manager 4 is a department or a person in charge which/who performs drawing-up of a long-term or short-term electricity sales plan, conclusion of a new power supply contract with a consumer and management of the existing electricity supply contracts and is equipped with a sales management apparatus 40 adapted to manage the drawn-up sales plan and information on the consumers with whom the electricity supply contracts are concluded.

The transaction manager 5 is a department or a person in charge which/who plans and executes transactions for electricity procurement through a direct contract with another/other electricity utility/utilities or via the exchange and is equipped with a transaction management apparatus 50 adapted to manage information on electricity procurement and transaction plans and already concluded electricity procurement contracts and exchange telegrams which relate to the transaction with another/other electricity utility/utilities and the exchange.

The facility manager 6 is a department or a person in charge which/who performs drawing-up and execution of operation plans of electric power generation facilities that the company itself owes or electric power generation facilities which can be incorporated into its own electricity procurement plans, other than its own electric power generation facilities and is equipped with a facility management apparatus 60 adapted to manage information on the electric power generation facilities, to draw up the operation plans of the electric power facilities and to transmit control signals for execution and a control device 61 adapted to receive the control signals from the facility management device 60 and actually execute the control of the electric power generation facilities.

On the other hand, the system operator 7 is a business operator which/who manages a power transmission and distribution system facility which spans a wide range and measures a demand achievement of each consumer in an area and retains the measured value and is equipped with a system information management apparatus 70 which distributes the measured demand achievement value of each consumer.

In addition, the transaction market operator 8 is a business operator which/who generally manages information and procedures which are necessary to perform electric power transactions for the plurality of electricity utilities and is equipped with a market operation management apparatus 80 adapted to distribute information which relates to the electricity transactions and to perform processing of matching orders which are accepted from the respective electricity utilities.

The public information provider 9 is a business operator which/who provides past observation information and future prediction information which relate to the weather such as a temperature, a humidity, a solar radiation amount and so forth and is equipped with a public information distribution apparatus 90 adapted to distribute the observation information and the prediction information on the weather.

The consumer 10 is a private person or a juridical person who/which has a load facility and a power generation facility and is equipped with an information input/output terminal 101 adapted to transmit information which would influence the demand and the power generation trend such as facilities and installation that he owes, the business type, the number of persons therein, the location and so forth to the electricity utility 2 or the system operator 7 and a measurement apparatus 100 adapted to measure achievement amounts of the demand and power generation.

Figure 2:
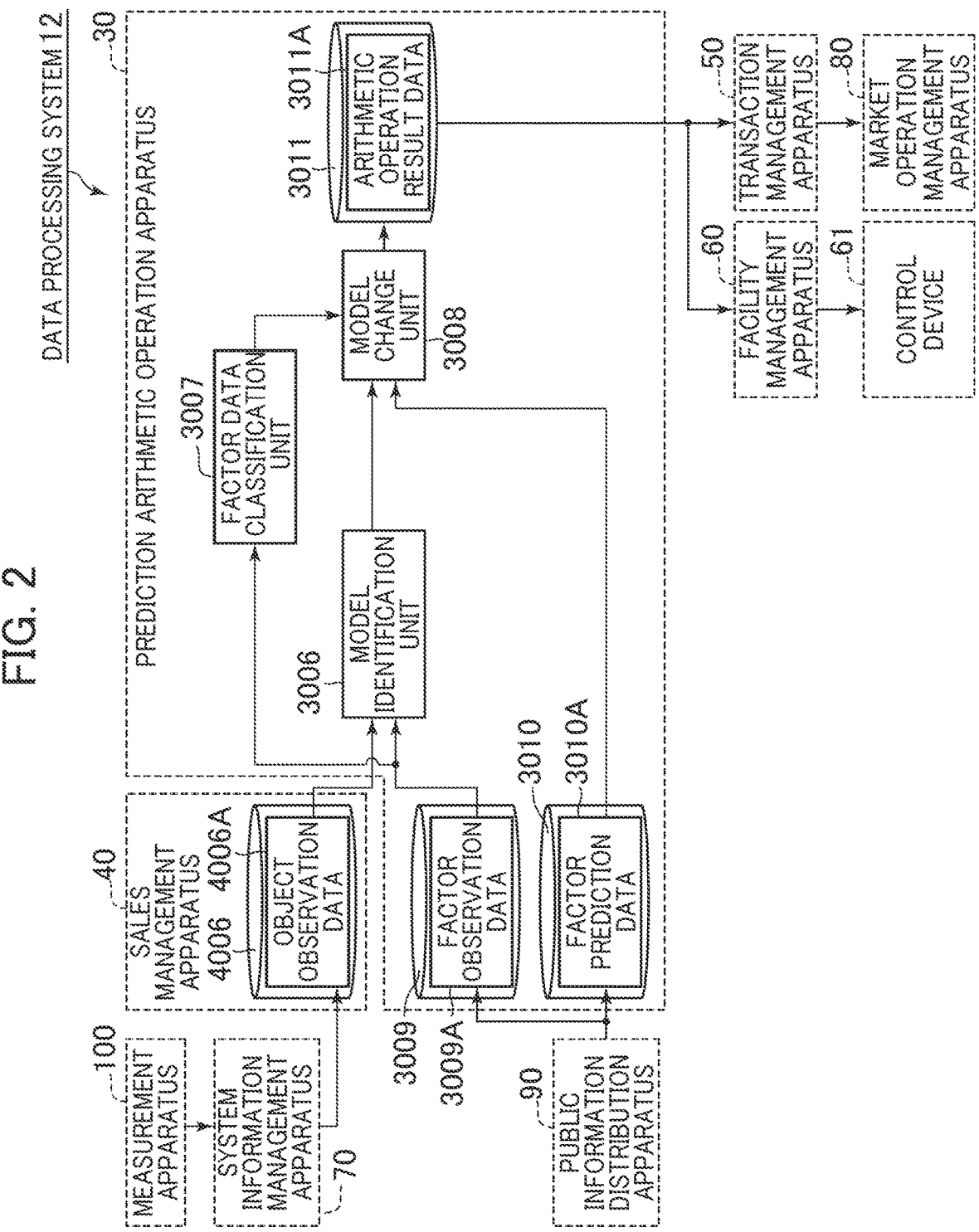
FIG. 2 is a whole configuration diagram of a data processing system.

FIG. 2 illustrates a data processing system which configures part of the supply and demand management system 1 and serves as a prediction arithmetic operation system according to the present embodiment. A data processing system 12 of the present embodiment is the system which calculates prediction data of a value of the power demand which is a prediction object and is configured by the prediction arithmetic operation apparatus 30 and the sales management apparatus 40.

The prediction arithmetic operation apparatus 30 calculates the prediction data of the power demand which is the prediction object in a prediction object time period on the basis of factor observation data 3009A and factor prediction data 3010A, and object observation data 4006A that the sales management apparatus 40 holds and holds it in arithmetic operation result data 3011A. Here, the arithmetic operation result data 3011A includes at least 0information on prediction data of a calculated representative demand value at a further time point, or a curve which indicates a time transition of a demand value in a future time period and prediction data which is calculated by correcting the curve. Then, the prediction arithmetic operation apparatus 30 transmits the arithmetic operation result data 3011A which is calculated in this way to the facility management apparatus 60 and the transaction management apparatus 50.

The sales management apparatus 40 holds the object observation data 4006A.

In this, the object observation data 4006A is information which is configured by the past object observation data 4006A of a contracted consumer and a consumer who is a contract conclusion object which are acquired from the measurement apparatus 100 and the system information management apparatus 70 and includes, for example, half-hourly achievement values of the power demand of each consumer 10 for the past several years.

(1-2) Internal Configuration

FIG. 3 illustrates specific configurations of the respective apparatuses which configure the data processing system. In FIG. 3, the prediction arithmetic operation apparatus 30 is configured by an information processing apparatus such as, for example, a personal computer, a server computer or a handheld computer and so forth as an arithmetic operation unit and is equipped with a CPU (Central Processing Unit) 3001 which generally controls the operation of the prediction arithmetic operation apparatus 30, an input device 3002, an output device 3003, a communication device 3004 and a storage device 3005.

The input device 3002 is configured by a keyboard or a mouse, the output device 3003 is configured by a display or a printer. In addition, the communication device 3004 is configured by being equipped with an NIC (Network Interface Card) adapted to be connected to a wireless LAN or a wired LAN. Further, the storage device 3005 is configured by storage media such as a RAM (Random Access Memory) and a ROM (Read Only Memory) and so forth.

Various computer programs such as a model identification unit 3006, a factor data classification unit 3007, a model change section 3008 and so forth are stored in the storage device 3005.

The model identification unit 3006 is a program which has a function of identifying a model for calculation of the prediction data of the prediction object from the object observation data 4006A which is the past observation data of the prediction object and the factor observation data 3009A which is pieces of past observation data of various factors which are elements which induce value changing of the prediction object as a first processing section which belongs to the arithmetic operation unit.

The factor data classification unit 3007 is a program which has a function of classifying time series data which indicates time transitions of values of respective factors which are stored in the factor observation data 3009A into a plurality of groups (sets) each being configured by mating pieces of data which are similar to each other/one another in time transition of the value as a second processing section which belongs to the arithmetic operation unit.

The model change unit 3008 is a program which has a function of extracting one group (set) of pieces of data which are similar to the time transition of the value of the factor in the prediction object time period from the plurality of groups into which mating pieces of data which are similar to each other/one another in time transition of the values are classified by using the factor prediction data 3010A of the time transition of the value of the factor in the prediction object time period, changing the model that the model identification unit 3006 identifies by using the extracted data group and calculating the prediction data of the prediction object in the prediction object time period by using the changed model as a third processing section which belongs to the arithmetic operation unit.

In addition, databases such as factor observation data 3009, factor prediction data 3010, and arithmetic operation result data 3011 and so forth are stored in the storage device 3005.

The factor observation data 3009 is the database in which pieces of past observation data of the various factors which are elements which induce value changing of the prediction object are stored. For example, in a case where the observation object is the power demand, factor data is data such as calendar day information which is date type information which indicates a year, a month, a day of the week, or a weekday, a holiday and so forth, weather information such as a temperature, a humidity, a solar radiation amount, a sunshine duration, an atmospheric pressure, a wind velocity and so forth, information which indicates presence/absence of occurrence of sudden incidents such as a typhoon, an event and so forth, or industrial dynamic information which indicates actual situations of various industries which would influence the power demand and so forth.

The factor prediction data 3010 is the database in which pieces of the prediction data of the respective factors which are stored in the factor observation data 3009 in the prediction object time period are stored.

The arithmetic operation result data 3011 is the database in which a final prediction result that the prediction arithmetic operation apparatus 30 calculates or intermediate data in a calculation process is stored and includes prediction result data of the prediction object in the prediction object time period, or curve data which indicates the time transition of the prediction object in the same time period, or correction data for correction of the curve, or information of models used in the arithmetic operation for calculation of these pieces of data.

On the other hand, the sales management apparatus 40 is configured by an information processing apparatus such as, for example, a personal computer, a server computer or a handheld computer and so forth and is equipped with a CPU 4001 which generally controls the operation of the sales management apparatus 40, an input device 4002, an output device 4003, a communication device 4004 and a storage device 4005.

The input device 4002 is configured by a keyboard or a mouse and the output device 4003 is configured by a display or a printer. In addition, the communication device 4004 is configured by being equipped with an NIC to be connected to a wireless LAN or a wired LAN.

The storage device 4005 is configured by storage media such as a RAM and a ROM and databases such as the object observation data 4006 and so forth are stored therein.

The object observation data 4006 is a database in which the past observation data of the prediction object is stored. For example, in a case where the prediction object is the power demand, various kinds of information which include past demand achievement information on the contracted consumer 10 or the consumer 10 who is planning to make a contract which are received and acquired from the measurement apparatus 100 and the system information management apparatus 70 are stored therein. The granularity of the achievement information is, for example, 30 minutes and so forth as a unit time and the time period ranges from several days to several years.

(1-3) Prediction Arithmetic Processing

FIG. 4 illustrate process procedures of prediction arithmetic processing in the data processing system. This processing is processing which is started, by using that the prediction arithmetic operation apparatus 30 accepts an inputting operation from the supply and demand manager 3 as a trigger, or by using a time interval or a time which is set in advance as the trigger and processes from step S101 to step S103 are executed by the prediction arithmetic operation apparatus 30.

Incidentally, the processing is executed on the basis of the various computer programs which are stored in the CPU 3001 and the storage device 3005 of the prediction arithmetic operation apparatus 30 in reality. For the convenience of description, description will be made by setting a processing entity as the various computer programs that the prediction arithmetic operation apparatus 30 has.

First, the model identification unit 3006 identifies the models used in calculation of the prediction data of the prediction object in the prediction object time period from the object observation data 4006A which is the past observation data of the prediction object and the factor observation data 3009A which is pieces of the past observation data of the various factors which are the elements which induce value changing of the prediction object (S101). Incidentally, here, the models are, for example, linear regression models such as time series regression models and so forth such as single regression model, multiple regression model, an AR model, an ARIAM model and so forth, a nonlinear regression model such as a neural network and so forth which are adapted to obtain scalar values such as a maximum value, a minimum value and so forth of a value of the prediction object at a certain time or a value of the prediction object in a certain time period, or a decision tree which is adapted to discriminate a function and a numerical value vector which indicate the transition of the value in the prediction object time period, or a rule which is set for discrimination and so forth.

On the other hand, the factor data classification unit 3007 classifies pieces of the time series data which indicate the time transitions of the values of the respective factors which are stored in the factor observation data 3009A into the plurality of groups each being configured by mating pieces of data which are similar to each other/one another in time transition of the value (S102). More specifically, for example, first, it calculates the index data which indicates periodic features of respective pieces of the time series data by performing processing such as Fourie transform, wavelet transform and so forth on pieces of the time series data which indicate the time transitions of the values of the respective factors. Then, it classifies them into the plurality of groups each being configured by mating pieces of the data which are similar to each other/one another in time transition of the value by performing clustering processing that the calculated index data is used as a feature vector. Well-known clustering technologies such as vicinity optimization unsupervised clustering algorithms such as k-means, an EM algorithm and spectral clustering, or discrimination surface optimization unsupervised clustering algorithms such as unsupervised SVM (Support Vector Machine) and VQ (Vector Quantization) algorithms, an SOM (Self-Organizing Maps) and so forth may be applied to the clustering processing which is used here.

Then, finally, the model change unit 3008 changes the model used for calculation of the prediction data of the prediction object in the prediction object time period that the model identification unit 3006 calculates by using the plurality of groups of pieces of data each being configured by mating pieces of the data which are similar to each other/one another in time transition of the value that the factor data classification unit 3007 calculates and the factor prediction data 3010A and calculates the prediction data by using the changed model (S103). More specifically, for example, the factor data classification unit 3007 extracts pieces of the factor observation data which are similar to the time series data which indicates the time transition of the value of the factor in the prediction object time period which is stored in the factor prediction data 3010A in pieces of the time series data which indicate the time transitions of the values of the respective factors which are stored in the factor observation data 3009A and changes the model that the model identification unit 3006 calculates so as to strengthen the degree that those pieces of the factor observation data comply with object observation data which corresponds to the observation dates and times of pieces of the factor observation data. On this occasion, a scale of the compatibility degree may be calculated as the residual sum of squares of the calculated model and each piece of the object observation data. In addition, a scale of similarity may be calculated as, for example, a Euclidean distance between mating pieces of the index data which indicate the periodic features of the time series data.

With the above processing, the prediction arithmetic processing in the present embodiment is terminated.

In the following, details of the embodiment of each processing unit will be described by using the drawings.

(1-4) Details of Respective Constitutional Elements (1-4-1) Model Identification Unit FIG. 5 illustrates a detailed embodiment of the model identification unit 3006 in the data processing system 12.

The model identification unit 3006 in the present embodiment calculates a discrimination model 3006B adapted to discriminate a function of calculating the prediction data of the time transition of the prediction object in the prediction object time period by using the object observation data 4006A and the factor observation data 3009A.

(1-4-1-1) Time Transition Function Group Generation Section

A time transition function group generation section 3006A1 generates a group of representative functions (a group of time transition functions) which indicate the time transitions of the prediction object from the time series data of the past observation data of the prediction object which is stored in the object observation data 4006A.

Specifically, first, it subdivides the time series data of the past observation data of the prediction object into time intervals which are the same as the time period to be predicted and calculates the index data which indicates the periodic feature by performing frequency analysis processing such as the Fourier transform, the wavelet transform and so forth on each subdivided piece of the time series data. Then, it performs clustering processing that the calculated index data is used as the feature vector and thereby classifies the group of pieces of time series data of the past observation data of the prediction object as a cluster (a set) in such a manner that mating pieces of the data which are similar to each other/one another in periodic features belong to one group. The well-known clustering technologies such as the vicinity optimization unsupervised clustering algorithms such as the k-means, the EM algorithm and spectral clustering, or the discrimination surface optimization unsupervised clustering algorithms such as the unsupervised SVM (Support Vector Machine) and VQ (Vector Quantization) algorithms, an SOM (Self-Organizing Maps) and so forth may be applied to the clustering processing which is used here. Then, the function which indicates the time transition of the value of the prediction object is generated for every cluster. The function which is used here may be, for example, an optional formula that the time is set as an explanatory variable or a numerical value vector which is configured by a series of time-based values.

(1-4-1-2) Time Transition Function Discrimination Model Generation Section

A time transition function discrimination model generation section 3006A2 generates the discrimination model 3006B adapted to discriminate a time transition function to be used in the prediction object time period in the group of the time transition functions that the time transition group generation section 3006A1 calculates by using the factor observation data 3009A.

Specifically, it calculates the discrimination model 3006B for the time transition function that the factor which is stored in the factor observation data 3009A is used as a discriminator by performing discriminator learning algorithm processing that the number of the cluster to which respective pieces of the time series data of the object observation data which is calculated by the time transition function group generation section 3006SA belong is used as a teacher label. Here, well-known technologies such as decision tree learning algorithms such as CART, ID3, Random Forest and so forth, discrimination plane learning algorithms such as SVM (Support Vector Machine) and so forth may be applied to the discriminator learning algorithm.

(1-4-2) Factor Data Classification Unit

Figure 6:
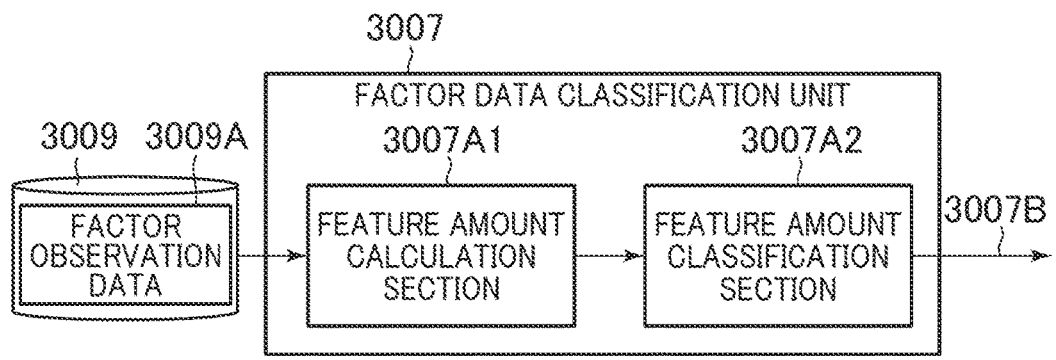
FIG. 6 is a function block diagram illustrating one embodiment of factor data classification processing.

FIG. 6 illustrates a detailed embodiment of the factor data classification unit 3007 in the data processing system 12.

The factor data classification unit 3007 in the present embodiment classifies pieces of the past time series observation data of the various factors which are stored in the factor observation data 3009A into mating pieces of data which are similar to each other/one another in time transition and calculates classification result data 3007B.

(1-4-2-1) Feature Amount Calculation Section

A feature amount calculation section 3007A1 calculates index data which indicates a periodic feature of each of the various factors which are stored in the factor observation data 3009.

Specifically, it subdivides the time series of pieces of the past observation data of the various factors into predetermined time intervals and calculates the index data which indicates the periodic feature by performing the frequency analysis processing such as the Fourier transform, the wavelet transform and so forth on each subdivided piece of the time series data of the various factors. Incidentally, here, the predetermined time interval may be the time interval which is the same as, for example, the prediction object period or may be an optional time interval before and after a correlation is observed in a change of the value of the past prediction object in the prediction object period.

(1-4-2-3) Feature Amount Classification Section

A feature amount classification section 3007A2 performs the clustering processing that the index data that the feature amount calculation section 3007A1 calculates is used as a feature vector and thereby classifies respective groups of pieces of the series data groups of the various factors as clusters respectively in such a manner that mating pieces of the data which are similar to each other/one another in periodic feature belong to one group. The well-known clustering technologies such as the vicinity optimization unsupervised clustering algorithms such as the k-means, the EM algorithm and spectral clustering, or the discrimination surface optimization unsupervised clustering algorithms such as the unsupervised SVM (Support Vector Machine) and VQ (Vector Quantization) algorithms, an SOM (Self-Organizing Maps) and so forth may be applied to the clustering processing which is used here.

(1-4-3) Model Change Unit

Figure 7:
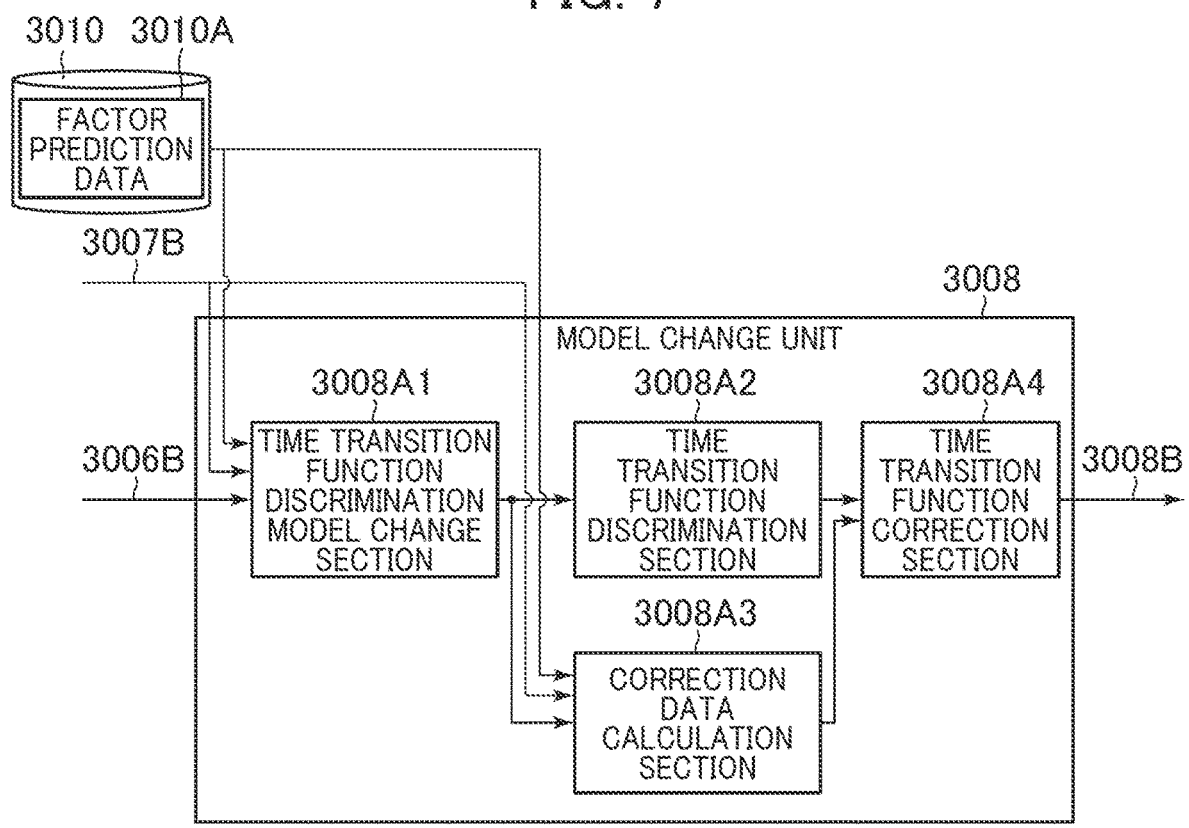
FIG. 7 is a function block diagram illustrating one embodiment of model change processing.

FIG. 7 illustrates one detailed embodiment of the model change unit 3008 in the data processing system 12.

The model change unit 3008 in the present embodiment changes the model (the discrimination model 3006B) that the model identification unit 3006 calculates by using the factor prediction data 3010 and the classification result data 3007B of the past observation time series of each of the factors that the factor data classification unit 3007 calculates and calculates prediction data 3008B of the prediction object in the prediction object time period by using the changed model and the factor prediction data 3010.

(1-4-3-1) Time Transition Function Discrimination Model Change Section

A time transition function discrimination model change section 3008A1 changes the model (the discrimination model 3006B) that the model identification unit 3006 calculates by using the factor prediction data 3010 and the classification result data 3007B of the past observation time series of each of the factors that the factor data classification unit 3007 calculates.

Specifically, first, it specifies one cluster which is similar to the prediction time series data of the time transition of the value of the factor in the prediction object time period which is stored in the factor prediction data 3010A in the classification result data 3007B obtained after clustering of pieces of the past observation time series data of the various factors that the factor data classification unit 3007 calculates for each of the factors. Here, the scale of similarity may be defined by, for example, the Euclidean distance between pieces of the index data which indicate the periodic feature of each piece of the time series data.

Then, it extracts the past observation data of the observation object which corresponds to the observation date and time of each piece of the factor data which belongs to the specified cluster from the object observation data 4006A and changes the discrimination model (the time transition function discrimination model) 3006B so as to more strengthen the compatibility of the extracted observation data with the object observation data 4006A. Here, the scale of the compatibility may be defined by the residual sum of squares of, for example, the object observation data and an estimated value which is calculated from the model and so forth.

(1-4-3-2) Time Transition Function Discrimination Section

A time transition function discrimination section 3008A2 discriminates a time transition function adapted to calculate the time transition of the prediction object in the prediction object time period by using the model that the time transition function discrimination model change section 3008A1 changes and the factor prediction data 3010A.

Specifically, it calculates the time transition function adapted to calculate the time transition of the prediction object in the prediction object time period by inputting the factor prediction data 3010A into a discriminator which is the discrimination model which is changed by the time transition function discrimination model change section 3008A1. Incidentally, in a case where one-time transition function cannot be uniquely specified and the plurality of functions are calculated, a function which is weighted with data such as a probability, a likelihood and so forth relative to each of the functions which are separately output from the discriminator may be used and they may be simply linearly coupled.

(1-4-3-3) Correction Data Calculation Section

A correction data calculation section 3008A3 calculates correction data for correction of the magnitude of an amplitude value of the function (the time transition function) which indicates the time transition of the prediction object in the prediction object period that the time transition function discrimination section 3008A2 calculates by using the classification result 3007B of the factor data that the factor data classification unit 3007 calculates and the factor prediction data 3010A. Incidentally, here, the correction data is specifically, for example, a maximum value, a minimum value, an integrated value of the prediction object in the prediction object time period or an optional time period in the prediction object time period, or a value of the prediction object at an optional time in the prediction object time period, or a bias value which is added to or subtracted from the above-mentioned function, a magnification value which is multiplied by the function and so forth.

Specifically, first, it specifies one cluster which is similar to the prediction time series data of the time transition of the value of the factor in the prediction object time period which is stored in the factor prediction data 3010A in the classification result data 3007B after clustering of pieces of the past observation time series data of the various factors that the factor data classification unit 3007 calculates for each of the factors. Here, the scale of similarity may be defined by, for example, the Euclidean distance between pieces of the index data which indicate the periodic feature of each pieces of the time series data.

Then, it extracts the past observation data of the prediction object which corresponds to the observation date and time of each piece of the factor data which belongs to the specified cluster from the object observation data 4006A and calculates the correction data by using the extracted object observation data and pieces of the factor data which belong to the above-mentioned specified cluster. Here, a calculation method may be arithmetic averaging of pieces of the extracted object observation data or averaging which is weighted with the index data which indicates the degree of similarity between the factor data which belongs to the specified cluster and a predicted value of the factor data in the prediction object time period. Alternatively, the correction data may be calculated by identifying a regression model from the factor data which belongs to the specified cluster and by inputting the factor prediction data 3010A into the identified regression model. In addition, on this occasion, further, weighted model identification that the index data which indicates the degree of similarity between the factor data which belongs to the specified cluster and the predicted value of the factor data in the prediction object time period is used as a weight is also allowed.

(1-4-3-4) Time Transition Function Correction Section

A time transition function correction section 3008A4 corrects the function (the time transition function) which indicates the time transition of the prediction object that the time transition function discrimination section 3008A2 calculates by using the correction data that the correction data calculation section 3008A3 calculates and thereby calculates the prediction data 3008 in the prediction object time period.

Specifically, it changes the amplitude or the frequency of the function which indicates the time transition of the prediction object and that the time transition function discrimination section 3008A2 calculates so as to be compatible with the correction data that the correction data calculation section 3008A3 calculates. Here, the scale of the compatibility may be defined as the residual sum of squares of, for example, the correction data and an estimated value which is calculated from the function which indicates the time transition of the prediction object. In addition, in a case of a form that the function which indicates the time transition is expressed by a calculation formula, it calculates the prediction data of the prediction object by inputting the predicted values of the various factors which are stored in the factor prediction data 3010A into the corrected function. Alternatively, in a case where the function which indicates the time transition is a numerical value vector, it calculates the corrected numerical value vector as the prediction data 3008 of the prediction object. Then, it stores the calculated prediction data 3008 into the arithmetic operation result data storage unit 3011 as the arithmetic operation result data 3011A.

The facility management apparatus 60 calculates an operation plan of an operable power generation facility on the basis of the arithmetic operation result data 3011A which is calculated by the prediction arithmetic processing which has been described so far and transmits it to the control device 61. The control device 61 which receives the operation plan calculates a specific control value of the power generation facility and executes actual control.

In addition, the transaction management apparatus 50 prepares a transaction plan which pertains to electricity trading with other electricity utilities and the transaction market and transmits telegrams for buy-sell orders, order cancellation and so forth to the market operation management apparatus 80.

The operation of the supply and demand management system 1 is completed with the above operations.

(1-5) Description of Effects of the Present Invention

Figure 8:
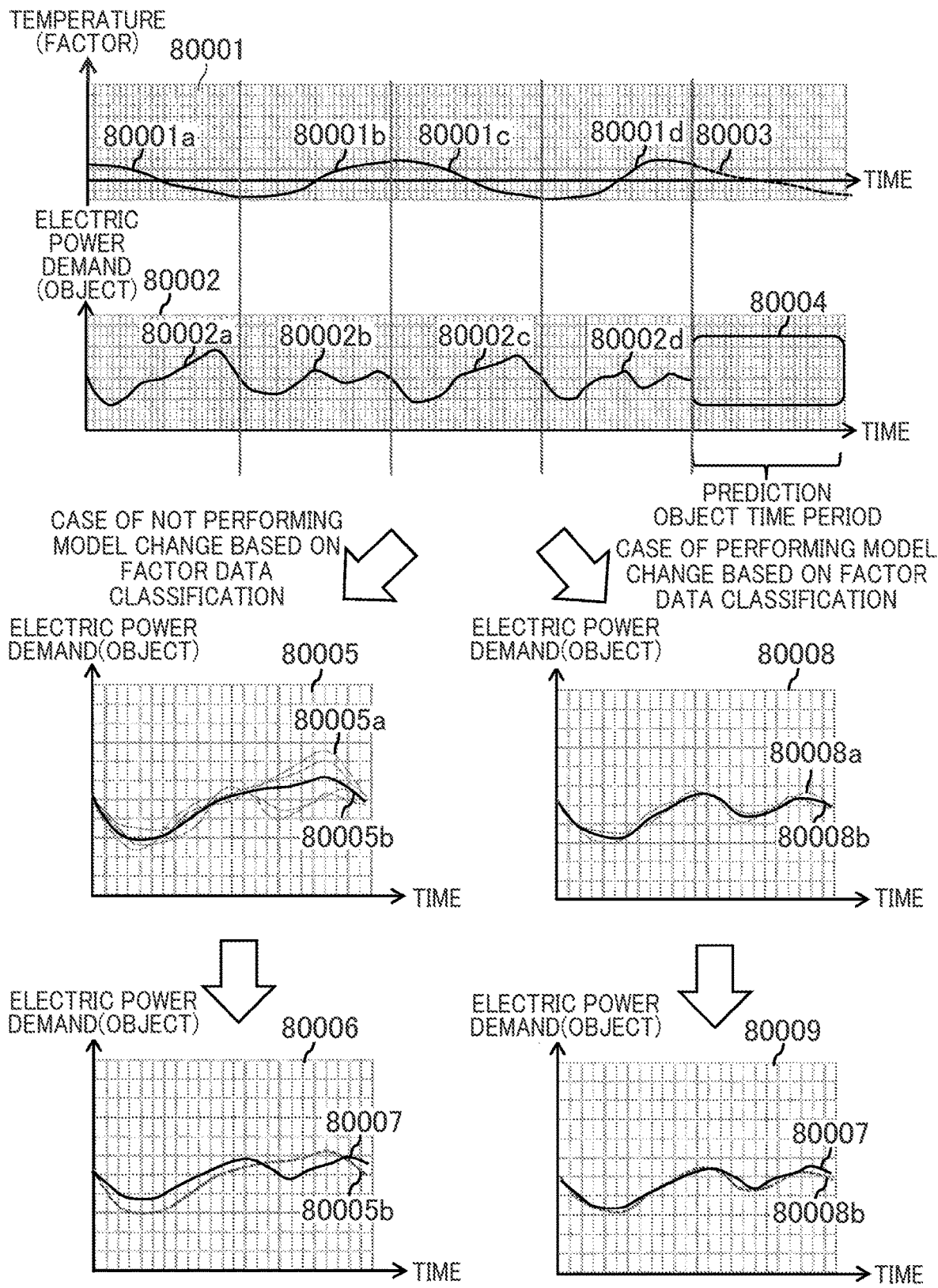
FIG. 8 is conceptual diagrams illustrating the effect and the principle of the present invention.
Figure 9:
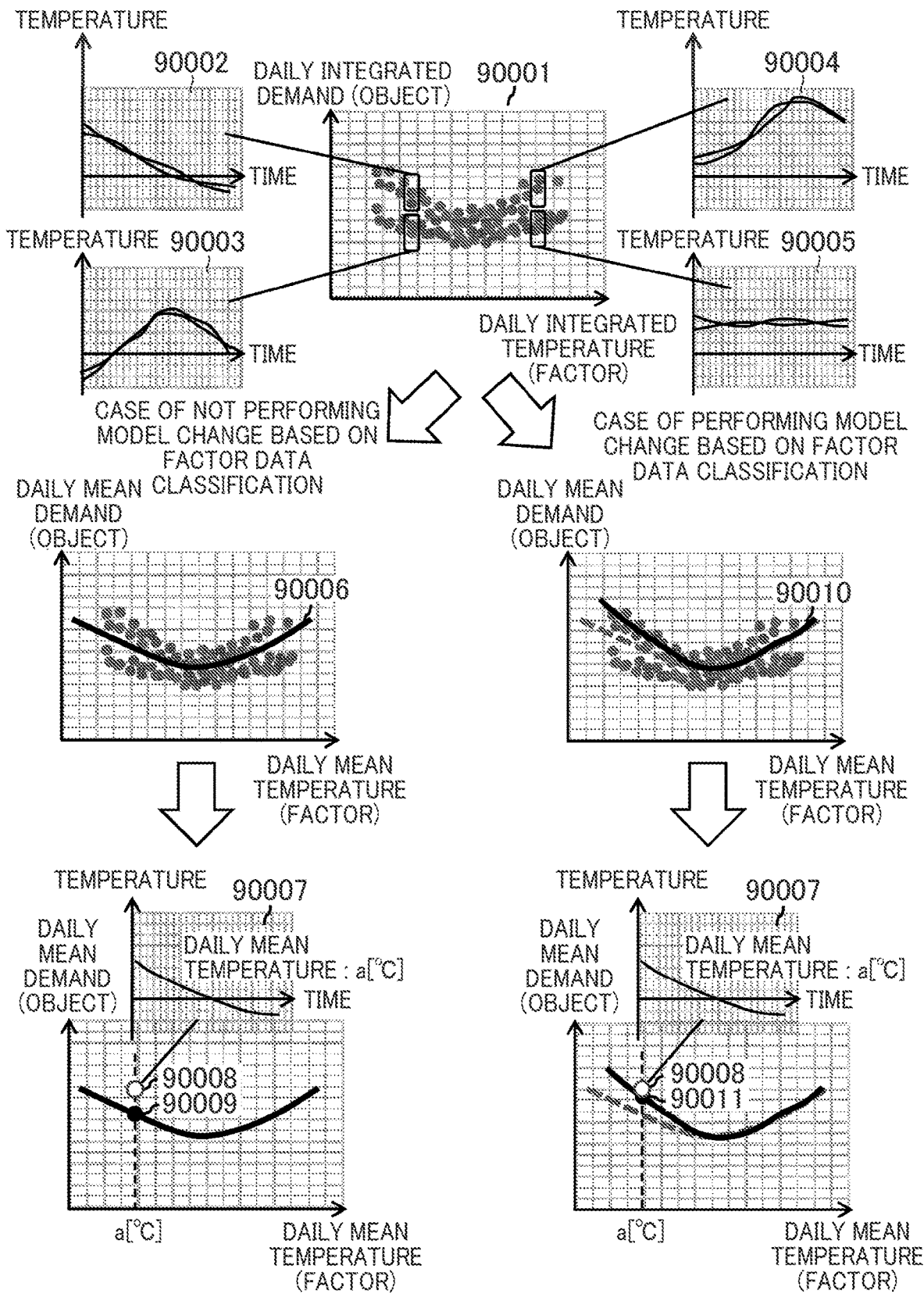
FIG. 9 is conceptual diagrams illustrating the effect and the principle of the present invention.

Conceptual diagrams which describe the effects and the principle according to the present embodiment are illustrated in FIG. 8 and FIG. 9.

First, FIG. 8 illustrates conceptions of the process and the result of calculating the prediction data 3008B of the value which indicates the time transition of the prediction object in the prediction object time period in accordance with a discrimination model (a time transition function discrimination model) 3006B which is calculated by a time transition function group generation section 30006A1 and a time transition function discrimination model generation section 3006A2. Incidentally, here, the prediction object is hourly power demand in a day and only the daily mean temperature is set as the factor for simplification of description.

First, a graph which is denoted by 80001 is the graph which indicates the time transition of the temperature for certain five days including the prediction object time period. Incidentally, a dotted-line part which is denoted by 80003 is prediction data of the time transition of the temperature in the prediction object time period. Next, a graph which is denoted by 80002 is the graph which indicates the time transition of the power demand which is the prediction object for the same five days and the value of the time transition of the power demand in a frame which is denoted by 80004 is the prediction object.

Here, since the value of the daily mean temperature which is the factor is "0° C." any day as indicated in 80001, in a case of not performing model changing which is based on factor data classification, the discrimination model that the time transition function discrimination model generation section 3006A2 calculates becomes a model which would discriminate a function which represents an average curve of curves which indicate the time transitions of four-day power demand which is indicated in 80002. Accordingly, as indicated in a graph 80005, the function which indicates the time transition in the prediction object time period becomes a function which represents a curve which is the mean for the past four days which is denoted by 80005a. As a result, an error occurs relative to the real power demand value which is denoted by 80007 in a graph 80006.

On the other hand, in a case of performing model changing which is based on factor data classification, the factor data classification unit 30007 in the present embodiment classifies pieces of past observation data of the time transitions of the temperature which is the factor which are denoted by 80001a to 80001d into a first group (a group of pieces of the index data that the temperature is on a decreasing trend with time transition) of 80001a and 80001c and a second group (a group of pieces of the index data that the temperature is on an increasing trend with time transition) of 80001b and 80001d on the basis of pieces of the index data which indicate respective periodic features. Then, it extracts the past observation data in the first group which is similar to the index data (the index data that the temperature is on the decreasing trend with time transition) which indicates the periodic feature of the time transition of the temperature in the prediction object time period which is denoted by 80003. Then, it changes the discrimination model (the time transition function discrimination model) on the basis of 80002a and 80002c which denote pieces of the observation data of the power demand which correspond to the dates and times that the extracted temperatures in the first group are observed. Accordingly, as indicated in a graph 80008, the time transition function which is discriminated with the changed discrimination model is a function which represents a curve which is an average curve of the above-described two-day observation data which is denoted by 80008a and which indicates the time transition denoted by 80008b, and as a result of prediction which is based on this function, the error relative to the real power demand value which is denoted by 80007 is decreased as indicated in a graph 80009.

On the other hand, FIG. 9 illustrates the effects and the principle of model changing which is performed by the correction data calculation section 3008A3 in the present embodiment. Incidentally, here, the correction data (the prediction object) is a daily integrated demand amount and only the daily mean temperature is set as the factor for simplification of description.

First, a scatter diagram which is denoted by 90001 indicates a relation of the daily integrated demand which is the prediction object with a daily integrated temperature which is the factor on the past observation data. Here, as indicated by diurnal time transitions of the temperature which are indicated in 90002 and 90003, even when the values of the daily integrated temperature are the same as each other, the scales of the daily integrated demand become different from each other depending on the temperature transition in the daytime which is a peak time zone of the power demand. Likewise, as indicated in graphs 90004 and 90005, the same trend is present also in summer.

On this occasion, when model identification by a general least-square method is performed without performing model changing which is based on factor data classification, an average model that the residual sum of squares with all pieces of data is minimized is identified as denoted by 90006. However, in a case where the temperature in the daytime in the prediction object time period is on the decreasing trend as indicated in 90007, the daily integrated demand value which is predicted is underpredicted relative to the real daily integrated demand value which is denoted by 90008 as denoted by 90009.

On the other hand, in a case of performing model changing which is based on factor data classification, the factor data classification unit 30007 in the present embodiment classifies mating pieces of the data which are similar to each other/one another in periodic feature of the time transition of the temperature which is the factor as groups respectively as indicated in the graphs 90002, 90003, 90004, 90005. Then, it extracts the factor observation data (the data which is on the decreasing trend with time transition) which belongs to the group which is similar to the time transition (the data that the temperature is on the decreasing trend with time transition) of the factor in the prediction object time period which is indicated in 90007 and which is indicated in 90002 and changes the model as denoted by 90010 so as to more strengthen the compatibility with the observation data of the prediction object which corresponds to the date and time that the extracted factor observation data is observed. As a result, the error relative to the real daily integrated demand value is decreased as denoted by 90011.

It becomes possible to realize a decrease in prediction error by changing the model which calculates the prediction data on the basis of the time transition of the factor as described above.

(2) Other Embodiments (2-1) Modified Example of Factor Data Classification Unit

Although in the above-mentioned embodiment, the factor data is classified by the clustering processing which uses pieces of the index data which indicate the periodic features of the various factors by the factor data classification unit 3007, the embodiment may be modified within a range not deviating from model changing for prediction or plan calculation which is based on the similarity in time transition of the factor which is the gist of the present invention.

For example, only the past observation data of the factor that a distance or a difference amount between the index data which indicates the periodic feature of the past observation data and the index data which indicates the periodic feature in the prediction object time period in the various factors is in a range of values which are set in advance may be extracted and model changing may be performed in accordance with the extracted past observation data of the factor.

Alternatively, the distance or the difference amount between the index data which indicates the periodic feature of the past observation data and the index data which indicates the periodic features in the prediction object time period in the various factors may be weighted to the past observation data of the prediction or planning object and then model changing may be performed.

(2-2) Modified Example of Model Identification Unit

Although in the above-mentioned embodiment, such a description that the model change unit 3008 changes the model (the discrimination model) for prediction or plan calculation that the model identification unit 3006 calculates was made, identification and changing of the model for prediction or plan calculation may be processed simultaneously, not limited to this. That is, at the time point of the model identification processing for prediction or plan calculation, the data that the factor data classification unit 3007 calculates may be used and then model identification may be performed.

Specifically, model identification for prediction or planning data calculation may be performed by using, for example, pieces of the past factor observation data that the factor data classification unit 3007 calculates and which indicate the time transitions which are similar to the prediction data of the time transition of the factor in the prediction object time period and pieces of the observation data of the prediction or planning object which correspond to the dates and times that these pieces of the factor observation data are observed. Alternatively, the distance or the difference amount between the index data which indicates the periodic feature of the past observation data and the index data which indicates the periodic feature in the prediction object time period may be weighed to the past observation data of the prediction or planning object and then model identification may be performed. More specifically, for example, there are single regression model and multiple regression model parameter estimation that the distance or the difference amount between the index data which indicates the periodic feature of the past observation data and the index data which indicates the periodic feature in the prediction object time period is weighted to the past observation data of the prediction or planning object, regression parameter estimation that the similarity in temperature waveform is used as a weight or the decision tree learning such as the CART, the ID3, the Random Forest and so forth that the above weights are used, and the discrimination plane learning such as the SVM (Support Vector Machine) and so forth.

In addition, although in the above-mentioned embodiment, model identification and changing using the factor and object observation data which are newly extracted on the basis of the data that the factor data classification unit 3007 calculates, or model identification and changing using a weighting factor which is calculated on the basis of the data that the factor data classification unit 3007 calculates were described, model identification processing that the model identification unit 3006 performs or model changing processing that the model change unit 3008 performs may be performed by using the data that the factor data classification unit 3007 calculates as new factor data, not limited to this.

Specifically, for example, mating pieces of the data which are similar to each other/one another in time transitions of the various factors may be classified as the cluster by the factor data classification unit 3007 and thereafter the single regression model and multiple regression model parameter estimation processing, or the decision tree learning processing such as the CART, the ID3, the Random Forest and so forth and the discrimination plane learning processing such as the SVM (Support Vector Machine) and so forth may be performed by using the discriminator for discriminating the cluster to which pieces of data of the various factors belong as new factor data. Incidentally, in a case of this modified example, calculation of the prediction data or the planning data is performed by specifying the discriminator for the cluster which is the closest to the time transitions of pieces of the prediction data of the various factors in the prediction or planning object time period and adding the specified discriminator to the factor prediction data 3010A. In addition, it is also possible to execute profiling that "information on time-dependent temperature change" is introduced as attribute candidates.

(2-3) Modified Example of Object

Although in the above-mentioned embodiment, the model for calculation of the prediction data was described as the prediction model of the power demand, it may be also made as a model for calculation of prediction data of a prediction error or deviation, not limited to this.

Figure 10:
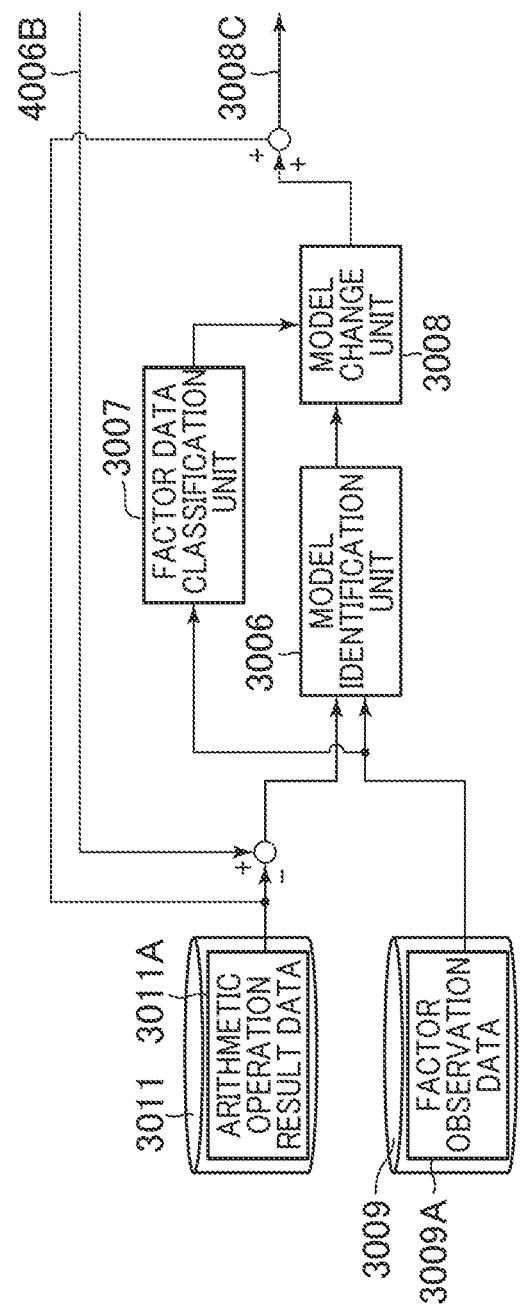
FIG. 10 is a whole configuration diagram illustrating one embodiment of the data processing system.

That is, as illustrated in FIG. 10, the error or the deviation which is a difference between prediction data of the power demand which is stored in the arithmetic operation result data 3011A which is finally calculated in the above-described embodiment and which is calculated up to the current date and time and power demand data 40006B which is the object observation data which is observed up to the current date and time is calculated. Then, changing of the model for calculation of a demand prediction error or a demand prediction deviation which is based on the time transition of the factor and prediction data calculation of the demand prediction error or the demand prediction deviation using the changed model may be performed by performing processing of the model identification unit 3006, the factor data classification unit 3007 and the model change unit 3008 which are described in the above-mentioned embodiment by setting this error or deviation as the prediction object. Incidentally, new prediction data 3008C is calculated by adding the calculated demand prediction error or demand prediction deviation to the original prediction data in the prediction object time period which is stored in the arithmetic operation result data 3011A.

(2-4) Modified Example of Object

Although in the above-mentioned embodiment, such a description that the processing that the data processing system 12 performs is calculation of the prediction data was made, planning data of, for example, a power generator start/stop plan, a plan of buying/selling the electric power at the electric power exchange and so forth may be set as the object, not limited to this.

Figure 11:
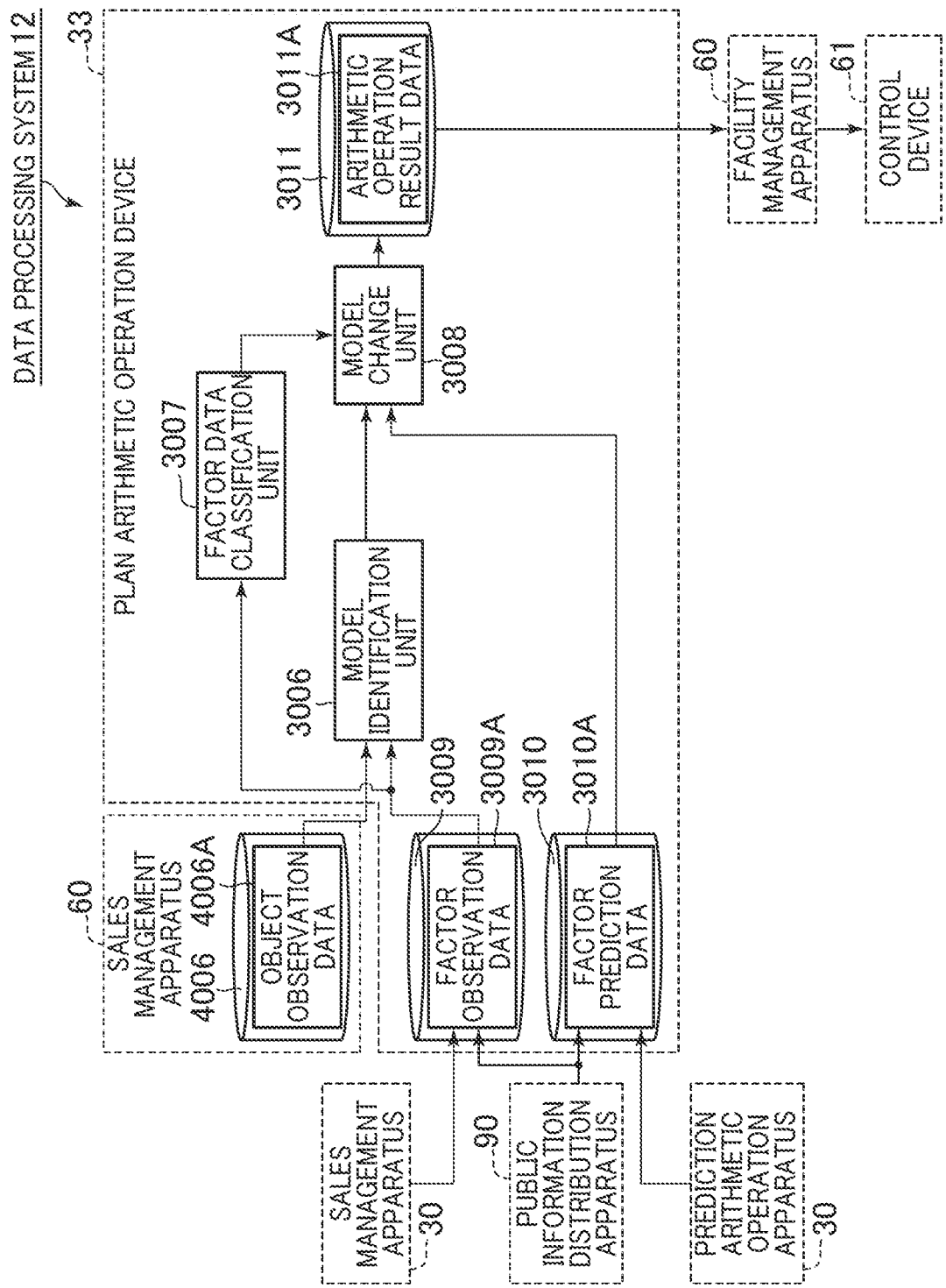
FIG. 11 is a whole configuration diagram illustrating one embodiment of the data processing system.

FIG. 11 illustrates a data processing system as a plan arithmetic operation system according to the present embodiment which configures part of the supply and demand management system 1. The data processing system 12 of the present embodiment is a system which calculates the planning data of the value of the power demand which is the planning object and is configured by a plan arithmetic operation device 33 and the facility management apparatus 60.

The plan arithmetic operation device 33 calculates the prediction data of the power demand which is the planning object in the prediction object time period on the basis of the factor observation data 3009A and the factor prediction data 3010A, and the object observation data 4006A that the facility management apparatus 60 holds and holds it into the arithmetic operation result data 3011A. Here, the arithmetic operation result data 3011A includes information on, at least, prediction data of a calculated representative demand value at a future time point, or a curve which indicates the time transition of the demand value in a future time period, and prediction data which is calculated by correcting the curve. Then, the plan arithmetic operation device 33 transmits the arithmetic operation result data 3001A which is calculated in this way to the facility management apparatus 60 and the control device 61.

In this modified example, the processing which is described in the above-mentioned embodiment may be performed in subsequent data processing by setting the object observation data 4006A which is input into the data processing system 1 2 as the past data of the above-mentioned planning data.

Specifically, for example, in the power generator start/stop plan, the object observation data 4006A is configured by a series of the number of the power generators which are started up hourly and a series of discriminators of the power generators, and a series of hourly power generation output values of each power generator. Then, the factor observation data 3009A also includes at least power demand data which is received from the sales management apparatus 40 in addition to the weather information on the temperatures and so forth which is received from the public information distribution apparatus 90. Accordingly, also at least the power demand prediction data which is received from the prediction arithmetic operation apparatus 30 is included in the factor prediction data 3010A in addition to the prediction data on the weather information.

Figure 12:
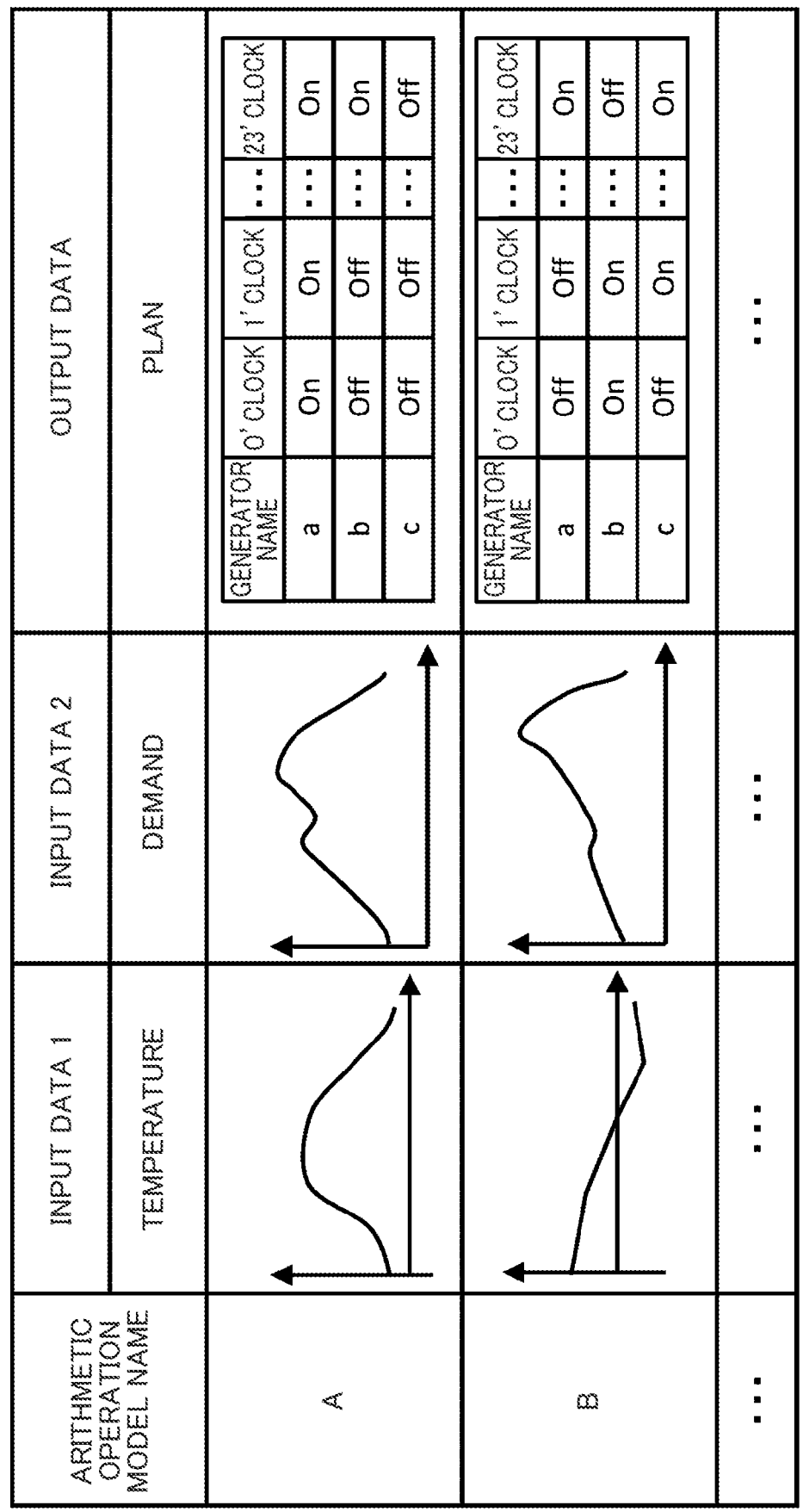
FIG. 12 is a diagram for explaining the concept of arithmetic operation models for plan preparation.

Here, an example of an arithmetic operation model 13000 for plan preparation which is identified by the model identification unit 3006 will be described by using FIG. 12. FIG. 12 is a diagram illustrating a concept in a case where a correspondence relation between input and output is modeled when the temperature and the demand which are the factor data are input and the power generator start/stop plan which is the object data is set as output data. Specifically, for example, an arithmetic operation model "A" indicates that in a case where the transition of the temperature which is input data 1 rises in the daytime and also the demand which is input data 2 transitions so as to reach the peak in the daytime, the hourly start/stop plans of power generators a, b, c are output as indicated in the third row.

After that, pieces of the processing of the factor data classification unit 3007 and the model change unit 3008 which have been already described are performed and thereby the arithmetic operation model for plan calculation which is illustrated in FIG. 12 is changed and the start/stop plan of the generators is calculated and stored into the arithmetic operation result data 3011A.

(2-5) Modified Example of Model Change Unit

Although in the above-mentioned embodiment, the description was made so as to perform model changing which is based on the data that the factor data classification unit 3007 calculates by targeting on one model, also model change processing of making a selection from the plurality of models or making the switch among them is allowable, not limited to this.

Figure 13:
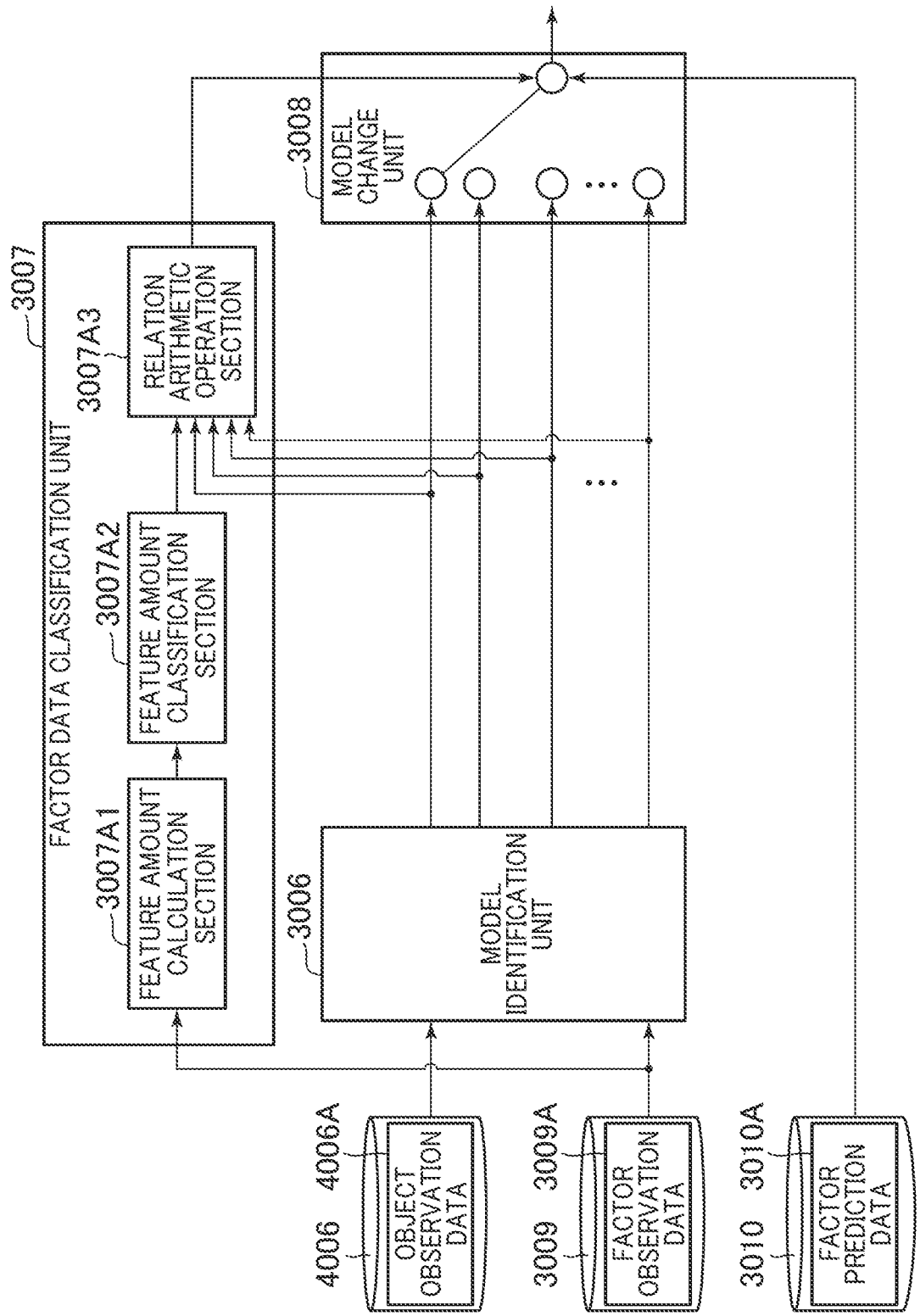
FIG. 13 is a whole configuration diagram illustrating one embodiment of the data processing system.

Specifically, the description will be made by using FIG. 13. First, the model identification unit 3006 identifies the plurality of models for calculation of the prediction data or the planning data by using the object observation data 4006A and factor observation data 3009A. Incidentally, the number of kinds of the models to be identified may be set in advance. Then, mating pieces of the data which are similar to each other/one another in time transitions of the values of the various factors are classified as one group through pieces of the processing of the factor data classification unit 3007, the feature amount calculation section 3007A1 and the feature amount classification section 3007A2 which are described in the above-mentioned embodiment. Then, a relation arithmetic operation section 3007A3 calculates the index data which indicates the compatibility with each of the models that the model identification unit 3006 calculates for each of the groups of mating pieces of the data which are similar to each other/one another in time transitions of the values of the various factors. Here, the index data which indicates the compatibility may be also defined as the residual sum of squares of, for example, an estimated value that each of n models calculates and the value of the object observation data which corresponds to the observation date and time of the factor which belongs to each of the above-mentioned respective groups. Then, the model change unit 3008 specifies the group which is similar to the time transitions of pieces of the prediction data of the various factors which are stored in the factor prediction data 3010A in the gropes that the feature amount classification section 3007A2 calculates, selects a model which is the highest in the index data which indicates the compatibility with the specified group and calculates the prediction data or the planning data by using the selected model. Through the above processing, the model change unit 3008 in the present embodiment performs change processing of switching the model used for calculation of the prediction data or the planning data on the basis of the time transition of the factor.

In addition, although in the above-mentioned modified example, the description was made assuming that model changing which is close to feedforward which is based on the time transition of the factor which is predicted is performed, model changing which is close to feedback that model changing is continuously performed appropriately on the basis of the time transition of the latest factor which is observed in the prediction object time period may be performed.

(2-6) Other Modified Examples

In addition, although in the supply and demand management system in the present embodiment, a display unit is omitted for simplification of description, a result of calculation of each processing unit and an intermediate result of each processing unit may be appropriately output via output devices such as the display, the printer and so forth.

In addition, although in the prediction that the data processing system 12 in the present embodiment performs, the description was made by setting the prediction object to the power demand, an object for which there exists time series data which is observed with time transition such as, for example, heat generation amounts of solar power generation and wind power generation, or an agreed price, a completed amount and so forth of an electric power product which is sold and bought on the electric power exchange may be applied, not limited to this. In addition, fields in which there exist time series data which is observed with time transition similarly such as, for example, a communication amount of a base station in the communications industry, local traffic volumes of vehicles and persons and so forth may be applied to the object, not limited to the field of the electric power. Incidentally, the data which indicates the time transition may be a raw-value series and may be a data-feature vector (vectors of various frequency intensities which are obtained by performing the Fourie transform on the raw-value series) which indicates the time transition. In addition, the data which indicates the time transition can be used as a new explanatory variable of the model. In this case, the explanatory variable has a discrete value and a scalar value.

LIST OF REFERENCE SIGNS

1 . . . supply and demand management system, 2 . . . electricity utility, 3 . . . supply and demand manager, 4 . . .

sales manager, 5 . . . transaction manager, 6 . . . facility manager, 7 . . . system operator, 8 . . . transaction market operator, 9 . . . public information provider, 10 . . . consumer, 30 . . . prediction arithmetic operation apparatus, 31 . . . information input/output terminal, 40 . . . sales management apparatus, 50 . . . transaction management apparatus, 60 . . . facility management apparatus, 61 . . . control device, 70 . . . system information management apparatus, 80 . . . market operation management apparatus, 90 . . . public information distribution apparatus, 111 . . . communication path, 112 . . . communication path.

The invention claimed is:

1. A data processing system for controlling a power generation facility including a plurality of generators to generate power in accordance with a predicted power demand, the system comprising:
a first database storing a series of power generation factor values observed over a time;
a first memory storing power demand values observed over the time;
a second memory configured to store computer-executable instructions;
a computer system configured to execute the computer-executable instructions whereby the computer system is configured to:
select a demand prediction model based on a relationship between transitions in the power generation factor observation values over the period of time and transitions in the power demand values over the period of time;
generate a predicted power demand based on the power generation factor values, the power demand values and the selected demand prediction model;
generate a plan for starting and stopping each of the plurality of power generators based on the predicted power demand;
a facility control apparatus configured to receive the plan and to generate control signals to control the power generation facility in accordance with the plan;
wherein the power generation facility executes the plan to generate the power to meet the predicted demand.

2. The data processing system according to claim 1, wherein the computer system is further configured to:
calculate a first index that indexes the transitions in the power generation factor values over the time to the transitions in the power demand values over the time,
calculate a second index that indexes transitions in power demand prediction values over the time to the to the power generation factor values over the time, and
a third processing section which calculates index data which indicates a degree of similarity between the first index data and the second index.

3. The data processing system according to claim 1, wherein the computer system is further configured to:
calculates pieces of first index data which are pieces of data which indicate time transitions respectively, in regard to pieces of factor observation data of various factors which pertain to prediction data or planning data,
calculate second index data which is data which indicates the time transition, in regard to pieces of factor prediction data of the various factors which pertain to the prediction data or the planning data, and
calculate index data which indicates a degree of similarity with the second index data in regard to respective pieces of the first index data and identifies or changes the model used in the calculation of the prediction data or the planning data so as to heighten compatibility with data that the calculated index data which indicates a degree of similarity of the time transition of the value of the factor is high.

4. The data processing system according to claim 1, wherein the computer system is further configured to:
calculate pieces of first index data which indicate predetermined variables respectively, in regard to pieces of factor observation data of various factors which pertain to prediction data or the planning data,
calculate second index data which indicates a predetermined variable, in regard to pieces of factor prediction data of the various factors which pertain to the prediction data or the planning data, and
identify or change a model used for calculation of prediction data or planning data by using the calculated first index data and the second index data as new factor data.

5. The data processing system according to claim 4, wherein an explanatory variable is included in the predetermined variable.

6. The data processing system according to the claim 2, wherein the computer system is further configured to:
identify a model for calculation of a curve which indicates a future time transition of power demand over a future power demand time period based on time series data of observed past demand prediction values, and
calculate a curve which indicates changes in the predicted power demand over the future power demand time period using the identified model.

7. The data processing system according to claim 6, wherein the computer system is further configured to:
classify each of time series of the power demand which is observed at predetermined time intervals into a set of time series to which data which indicates the kind of the time transition is close, and
calculate a model for calculation of the time series of the power demand in the power demand time period from the set of the time series using pieces of data of various factors which influence a fluctuation in time series of the power demand.

8. The data processing system according to claim 1, wherein the computer system is further configured to:
identify a plurality of candidates for models used in the calculation of the prediction data or the planning data from data comprising observations of power demand or a planning object and pieces of factor observation data of the various factors which pertain to the power demand or the planning object, and
select a model for calculation of the prediction data or the planning data on the basis of information which indicates the time transition of each of the factors.

9. The data processing system according to claim 8, wherein the computer system is further configured to:
classify the prediction data or the planning data into sets of pieces of data which are similar to each other/one another in time transition of factor observation data to which each piece of the prediction data or each piece of the planning data pertains,
calculate index data which indicates compatibility between each of the classified data sets and each of a plurality of candidates for models used for calculation of the prediction data or the planning data,
specify which of the classified data sets is closest to a time transition of a factor which is predicted in a power demand time period or a planning object time period, and select models which are high in index data which indicates compatibility with a specified data set as a plurality of models used in the arithmetic operation for calculation of the prediction data or the planning data.

10. The data processing system according to claim 8, wherein the computer system is further configured to:
classify the prediction data or the planning data into sets of pieces of data which are similar to each other/one another in time transition of factor observation data to which each piece of the prediction data or each piece of the planning data pertains,
calculate index data which indicates compatibility between each of the classified data sets and each of the plurality of candidates for the models used for calculation of the prediction data or the planning data,
specify which of the classified sets of data is closest to a time transition of a factor which is observed in a power demand time period or a planning object time period, and
select models which are high in index data which indicates compatibility with a specified data set as the plurality of models for calculation of the prediction data or the planning data.

11. The data processing system according to claim 1, wherein information which indicates a kind of time transition is a discriminator for discriminating the kind of transition of a value in each predetermined time period, or a numerical value string, or a function.

12. The data processing system according to claim 1, wherein the prediction data for calculation is an electric power demand amount and factor data for use in data of the various factors which pertain to the prediction data or the planning data is at least a temperature, or
the prediction data for calculation is a solar power generation amount and the factor data for use in the data of the various factors which pertain to the prediction data or the planning data is at least a solar radiant amount, a cloudiness humidity, or
the prediction data for calculation is a wholesale electric power price and the factor data for use in the data of the various factors which pertain to the prediction data or the planning data is at least the electric power demand, a power generation plan, a fossil fuel transaction price, or
the prediction data for calculation is a power generator start/stop plan and the factor data for use in data of the various factors which pertain to the prediction data or the planning data is at least the electric power demand amount, the wholesale electric power price.

13. The data processing system according to claim 1, wherein a model used for calculation of prediction data or planning data is at least, a model for calculation of a curve which indicates time transition of a value of a power demand or a planning object in a power demand time period or a planning object time period.

14. The data processing system according to claim 13, wherein the model used for calculation of the prediction data or the planning data is at least, a model for calculation of data for changing an amplitude or a frequency of the curve which indicates a time transition, or both of them.

15. A data processing method of controlling a power generation facility including a plurality of power generators to generate power in accordance with a predicted power demand, the method comprising:
selecting a demand prediction model based on a relationship between transitions in power generation factor observation values over a period of time and transitions in transitions in power demand values over the period of time;
generating a predicted power demand based on: the transitions in power veneration factor observation values over the period of time, the transitions in power demand values over the period of time and the selected demand prediction model;
generating a plan for starting and stopping each of the plurality of power venerators based on the predicted power demand;
generating control signals to control the power generation facility in accordance with the plan;
whereby the power generation facility generates the power to meet the predicted power demand.

16. The data processing method according to claim 15, wherein the calculating step includes an arithmetic operation step comprising:
a first step of calculating a first index based on the of power factor observation values over the time period,
a second step of calculating a second index based on the transitions in the values of the power demand predictions over the time, and
a third step of calculating a third index which indexes a degree of similarity between the first index and the second index.

* * * * *